(12) United States Patent
Yamamoto

(10) Patent No.: US 9,569,666 B2
(45) Date of Patent: Feb. 14, 2017

(54) SYSTEMS AND METHODS FOR MEASURING IMAGE RECOGNITION ACCURACY

(71) Applicant: Toyota Motor Engineering & Manufacturing North America, Inc., Erlanger, KY (US)

(72) Inventor: Kenichi Yamamoto, San Jose, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 74 days.

(21) Appl. No.: 14/630,765

(22) Filed: Feb. 25, 2015

(65) Prior Publication Data

US 2016/0247021 A1   Aug. 25, 2016

(51) Int. Cl.
*G06K 9/00* (2006.01)
*G06K 9/62* (2006.01)
*B25J 9/16* (2006.01)

(52) U.S. Cl.
CPC .......... *G06K 9/00624* (2013.01); *B25J 9/1697* (2013.01); *G06K 9/6202* (2013.01)

(58) Field of Classification Search
CPC .... G06K 9/00624; G06K 9/6202; G06K 7/14; G06K 7/1456; G06K 9/2081; G06K 9/3216; G06K 9/46; G06K 9/4652; G06K 9/6217; B25J 9/1697; G05D 1/0246; Y10S 901/01; Y10S 901/47
See application file for complete search history.

(56) References Cited

U.S. PATENT DOCUMENTS

| | | | |
|---|---|---|---|
| 5,740,286 A * | 4/1998 | Esashi | G06K 7/0163 382/286 |
| 6,453,055 B1 | 9/2002 | Fukumura et al. | |
| 7,774,100 B2 | 8/2010 | Aoyama | |
| 8,068,674 B2 * | 11/2011 | Goncalves | A47F 9/047 235/462.01 |

(Continued)

OTHER PUBLICATIONS

Black, et al., "Robot Navigation Made Easy with QR Codes" http://www.i-programmer.info/news/169-robotics/665-robot-navigation-made-easy-with-qr-codes.html, 2013.

(Continued)

*Primary Examiner* — Aaron W Carter
*Assistant Examiner* — Ian Lemieux
(74) *Attorney, Agent, or Firm* — Dinsmore & Shohl LLP

(57) ABSTRACT

Systems and methods for measuring image recognition accuracy are provided. One embodiment of a method includes locating an identifier in an environment, where the identifier is configured according to a predetermined format and where the identifier identifies an actual characteristic of an object. Some embodiments of the method include locating the object in the environment, determining a perceived characteristic of the object, and determining, from the identifier, the actual characteristic of the object. Similarly, some embodiments include comparing the actual characteristic of the object with the perceived characteristic of the object, determining whether the actual characteristic of the object substantially matches the perceived characteristic of the object and, in response to determining that the actual characteristic of the object does not substantially match the perceived characteristic of the object, determining a change to make for improving image recognition.

20 Claims, 4 Drawing Sheets

(56) References Cited

U.S. PATENT DOCUMENTS

2011/0317873 A1* 12/2011 Boncyk ............ G06F 17/30259
                                                                             382/103
2013/0346348 A1   12/2013  Buehler et al.
2014/0161345 A1    6/2014  Djugash

OTHER PUBLICATIONS

Li et al., "Mobile Robot Action Based on QR code Identification", Proceedings of the 2012 IEEE International Conference on Robotics and Biomimetics, Dec. 11-14, 2012, Guangzhou, China.

* cited by examiner

SYSTEMS AND METHODS FOR MEASURING IMAGE RECOGNITION ACCURACY

TECHNICAL FIELD

Embodiments described herein generally relate to systems and methods for measuring image recognition accuracy and, more specifically, to providing image recognition and assessing the image recognition accuracy for future improvements.

BACKGROUND

Robots are being utilized for an increasing number of tasks, such as cleaning an environment, transporting objects from a source area of an environment to a destination area of the environment, etc. Regardless of the particular use of the robot, the robot may utilize image recognition to determine various features of an environment. However, it is often difficult to determine the quality of the image recognition and there are often limited resources for improving the image recognition while the robot is in use.

SUMMARY

Systems and methods for measuring image recognition accuracy are provided. One embodiment of a method includes locating an identifier in an environment, where the identifier is configured according to a predetermined format and where the identifier identifies an actual characteristic of an object. Some embodiments of the method include locating the object in the environment, determining a perceived characteristic of the object, and determining, from the identifier, the actual characteristic of the object. Similarly, some embodiments include comparing the actual characteristic of the object with the perceived characteristic of the object, determining whether the actual characteristic of the object substantially matches the perceived characteristic of the object and, in response to determining that the actual characteristic of the object does not substantially match the perceived characteristic of the object, determining a change to make for improving image recognition.

Also provided is a system for measuring image recognition that includes a robot that traverses an environment, where the robot includes an image capture device and a local computing device. The local computing device may include a memory component that stores image recognition logic that, when executed by a processor, causes the robot to utilize the image capture device to locate an identifier in the environment, where the identifier is configured according to a predetermined format and wherein the identifier identifies an object. The image recognition logic may further cause the robot to determine an actual identity of the object from the identifier, utilize the image capture device to locate the object in the environment, and determine a perceived identity of the object. Correction logic may also be included and may cause the robot to compare the actual identity of the object with the perceived identity of the object, determine whether the actual identity of the object substantially matches the perceived identity of the object, and in response to determining that the actual identity of the object does not substantially match the perceived identity of the object, determine a change to make for improving image recognition. In some embodiments, the correction logic may change an aspect of the image recognition logic for improving the image recognition.

In yet another embodiment, a computing device for measuring image recognition accuracy is provided. The computing device may include a memory component that stores logic that, when executed by the computing device, causes the computing device to locate an identifier in an environment, where the identifier is configured according to a predetermined format and where the identifier identifies an actual characteristic of an object. In some embodiments, the logic further causes the computing device to locate the object in the environment, determine a perceived characteristic of the object, determine, from the identifier, the actual characteristic of the object, and compare the actual characteristic of the object with the perceived characteristic of the object to determine an image recognition accuracy. In some embodiments, the logic causes the computing device to determine whether the image recognition accuracy meets a predetermined threshold and in response to determining that the image recognition accuracy does not meet the threshold, determine a change to make for improving the image recognition accuracy.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for measuring image recognition accuracy. Some embodiments may be configured with hardware, such as an image capture device (e.g., still camera and/or video camera), a memory component, a processor, etc., as well as software for providing instructions related to image recognition and training of image recognition.

These embodiments may include an identifier (such as a QR code) that is placed near an object for detection. As an example, a restroom sign "Men" may be detected by the robot. A QR code may be placed close to the sign. The robot can detect the "Men" sign, as well as the orientation and location of the "Men" sign. The robot may additionally confirm the image recognition by detecting the QR code and comparing the detected image with the stored data related to the QR code. Additionally, the orientation and distance information may be verified utilizing the known location of the robot. In some embodiments, the robot may develop an algorithm for image recognition. The algorithm may be compared against real world image detection to determine the accuracy of the image detection.

Figure 1:
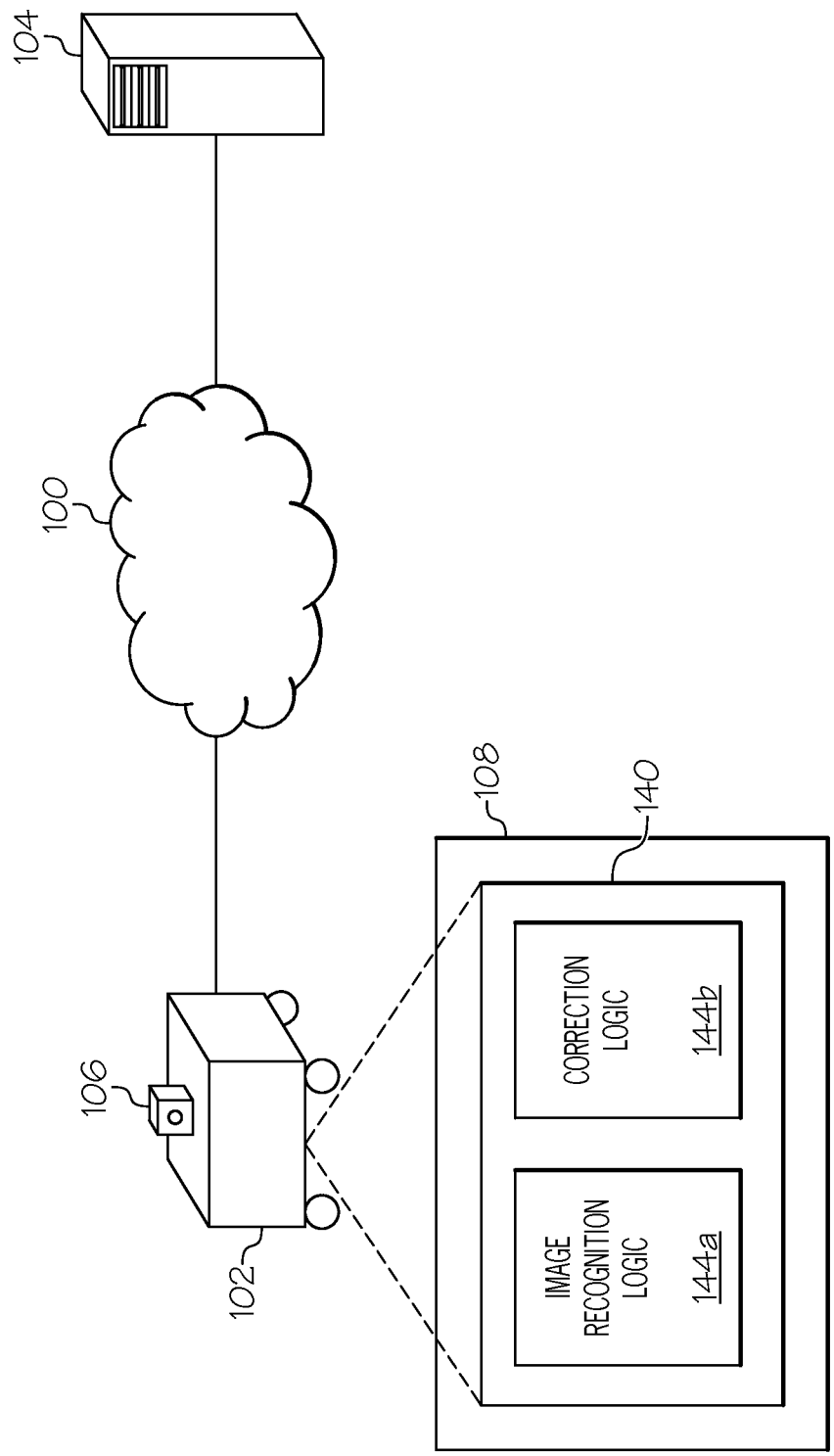
FIG. 1 schematically depicts a computing environment for measuring image recognition accuracy, according to embodiments disclosed herein.

Referring now to the drawings, FIG. 1 schematically depicts a computing environment for measuring image recognition accuracy, according to embodiments disclosed herein. As illustrated, the environment may include a network 100, a robot 102, and at least one computing device, such as a remote computing device 104 and/or a local computing device 108. The network 100 may include any wide area network, such as the internet, a cellular network, a telephone network, and/or others. In some embodiments, the network 100 includes a local area network, such as may be provided by Ethernet, wireless fidelity (Wi-Fi), near-field communication (NFC), Bluetooth®, etc. Regardless, the network 100 may facilitate communication between the robot 102, the remote computing device 104, and/or other computing devices.

The robot 102, which may include an image capture device 106 and a local computing device 108. The image capture device 106 may include a still camera, a video camera, infrared sensor (such as a bar code scanner, quick response (QR) code scanner, etc.), and/or other similar devices. The image capture device 106 may be configured to detect an object and/or an identifier (such as a bar code QR code, radio frequency (RF) identifier, etc.), as well as recognize the object and/or identifier, as described in more detail below. The local computing device 108 may include a memory component 140 that stores image recognition logic 144a and correction logic 144b.

The remote computing device 104 may be configured to communicate with the robot 102 and/or other computing devices via the network 100. While in some embodiments, the robot 102 may be configured detect and recognize objects and identifiers, as well as determine image recognition accuracy; this is just an example. In some embodiments, the robot 102 may be configured to communicate with the remote computing device 104 for recognizing the object and/or identifier. The robot 102 may also be configured to communicate with the remote computing device 104 for determining the accuracy of a recognized object and/or identifier. A display device (not explicitly depicted in FIG. 1 may also be utilized for providing a user interface to display this information.

Figure 2:
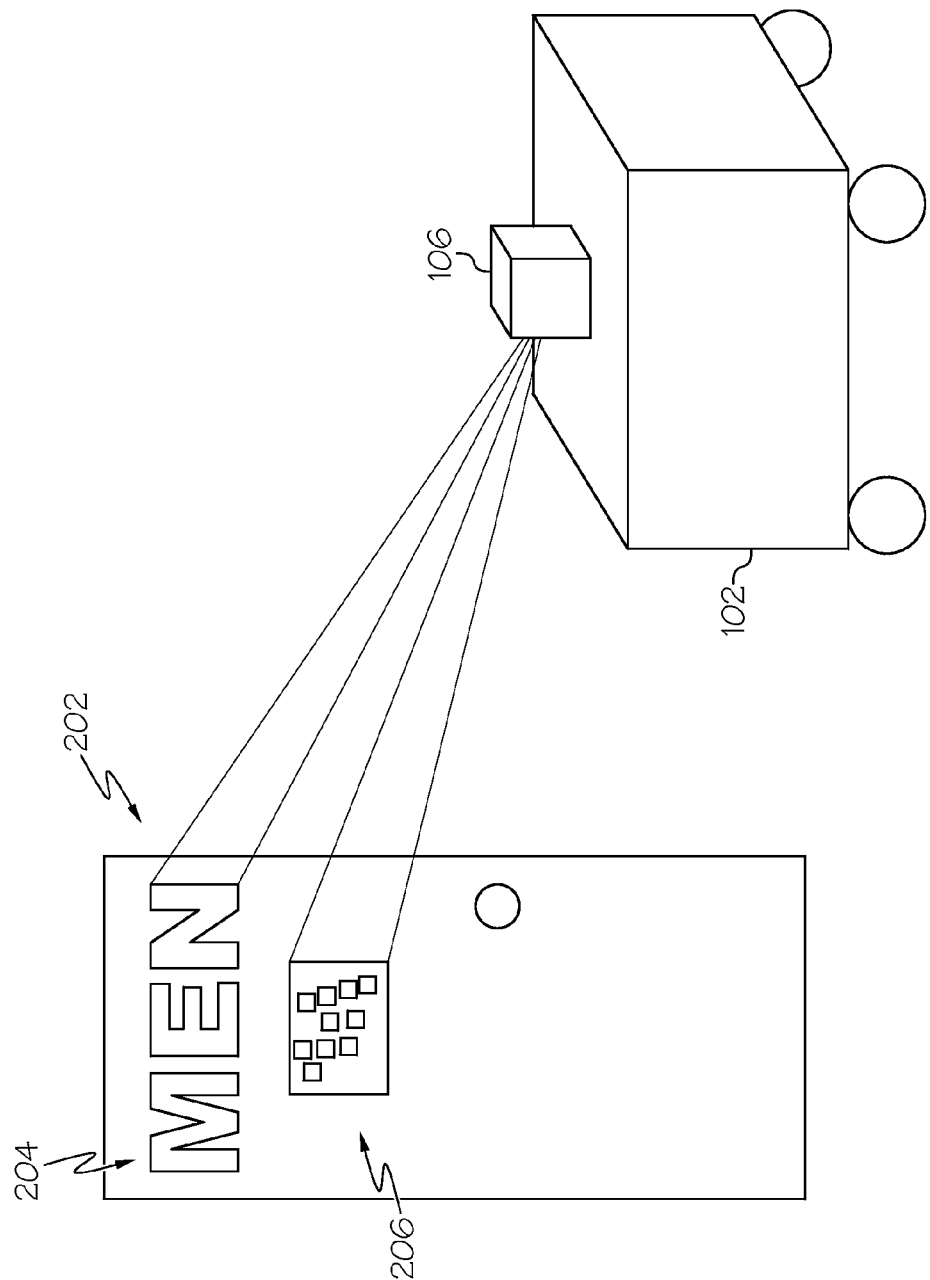
FIG. 2 schematically depicts a robot for recognizing an image in an environment, according to embodiments disclosed herein.
Figure 3:
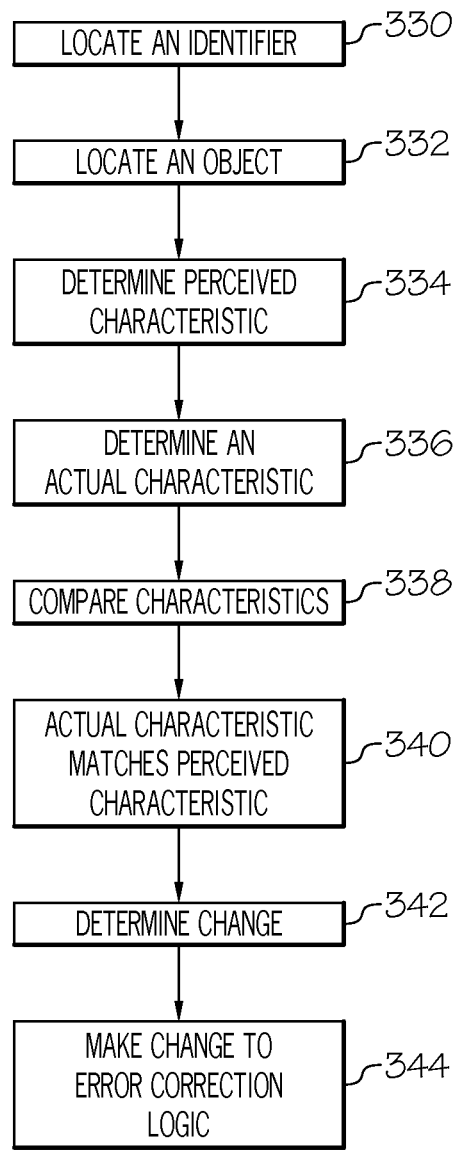
FIG. 3 depicts a flowchart for measuring image recognition accuracy according to embodiments disclosed herein.

FIG. 2 schematically depicts a robot 102 for recognizing an image 304 in an environment, according to embodiments disclosed herein. As illustrated, the robot 102 may be configured to detect an object and/or identifier via the image capture device 106. As discussed above, the image capture device 106 may be configured to detect an object, such as a sign 204 that says "MEN." The detection may be made via a still camera, video camera, an infrared camera, etc. The robot 102 may recognize and/or determine a perceived characteristic, such as a perceived identity of the object, a location of the object, a location of the robot when the object was recognized, an orientation of the object, a dimension of the object, a color of the object, etc. In the example of FIG. 3, the perceived characteristic may include recognizing that the image includes the word "MEN," an orientation of the object, a recognition that the object is a sign for the men's room, a location of the object (e.g., via a positioning system), etc.

The image capture device 106 (and/or another image capture device) may also detect the identifier 206, which may be embodied as a bar code, QR code, RF identifier, etc. The robot 102 may access a local data storage component (such as the data storage component 436 from FIG. 4) and/or communicate with the remote computing device 104 to decode the identifier 206. Additionally, upon reading the identifier 206, the robot 102 may determine an actual characteristic and/or actual identity of the object. The robot 102 may additionally compare the perceived characteristic with the actual characteristic to determine the accuracy of the image recognition. As an example, if the image capture device 106 determines that a perceived characteristic is that the sign says "MAN," but the actual characteristic is that the sign says "MEN," a determination may be made that the image recognition is not correct. Additionally, the local computing device 108 and/or remote computing device 104 may determine how the captured image that the image recognition is inaccurate. Based on how the image is inaccurate, corrections to the image recognition process may be made.

Accordingly, some embodiments may be configured with a threshold with regard to accuracy of image recognition. As an example, if it is determined that the image recognition meets or exceeds the accuracy threshold, error correction may not be implemented. If the image recognition does not meet or exceed the threshold, the error correction to the image recognition process may be implemented.

It should be understood that while the identifier may include a QR code, a bar code, an RF tag or the like, these are just examples. In some embodiments, the identifier may include a geo-location of the object. As an example, if the robot 102 determines (such as based on a determined geo-location) that the image capture device 106 is capturing a men's room door, this geo-location may be utilized as the identifier. Similarly, some embodiments may be configured to utilize a determined location of the object as another accuracy check to the image recognition. As an example, if the robot 102 identifies the object based on geo-location, this may be compared against the captured image of the object and/or the identifier that was detected. Based on the results of this comparison, error correction may be performed for the image recognition of the object and/or for the identifier.

FIG. 3 depicts a flowchart for measuring image recognition accuracy according to embodiments disclosed herein. As illustrated in block 330, image recognition accuracy may be measured, which includes locating an identifier in an environment, where the identifier is configured according to a predetermined format and where the identifier identifies an actual characteristic of an object. In block 332, the object may be located in the environment. In block 334, a perceived characteristic of the object may be determined. In block 336, an actual characteristic of the object may be determined. In block 338, the actual characteristic of the object may be compared with the perceived characteristic of the object. In block 340, a determination may be made regarding whether the actual characteristic of the object substantially matches the perceived characteristic of the object. In block 342, in response to determining that the actual characteristic of the object does not substantially match the perceived characteristic of the object, a change for object correction may be determined. This may include a change to an aspect of the image recognition logic 144a, and/or other change. In block 344, a change to the error correction logic may be made.

Figure 4:
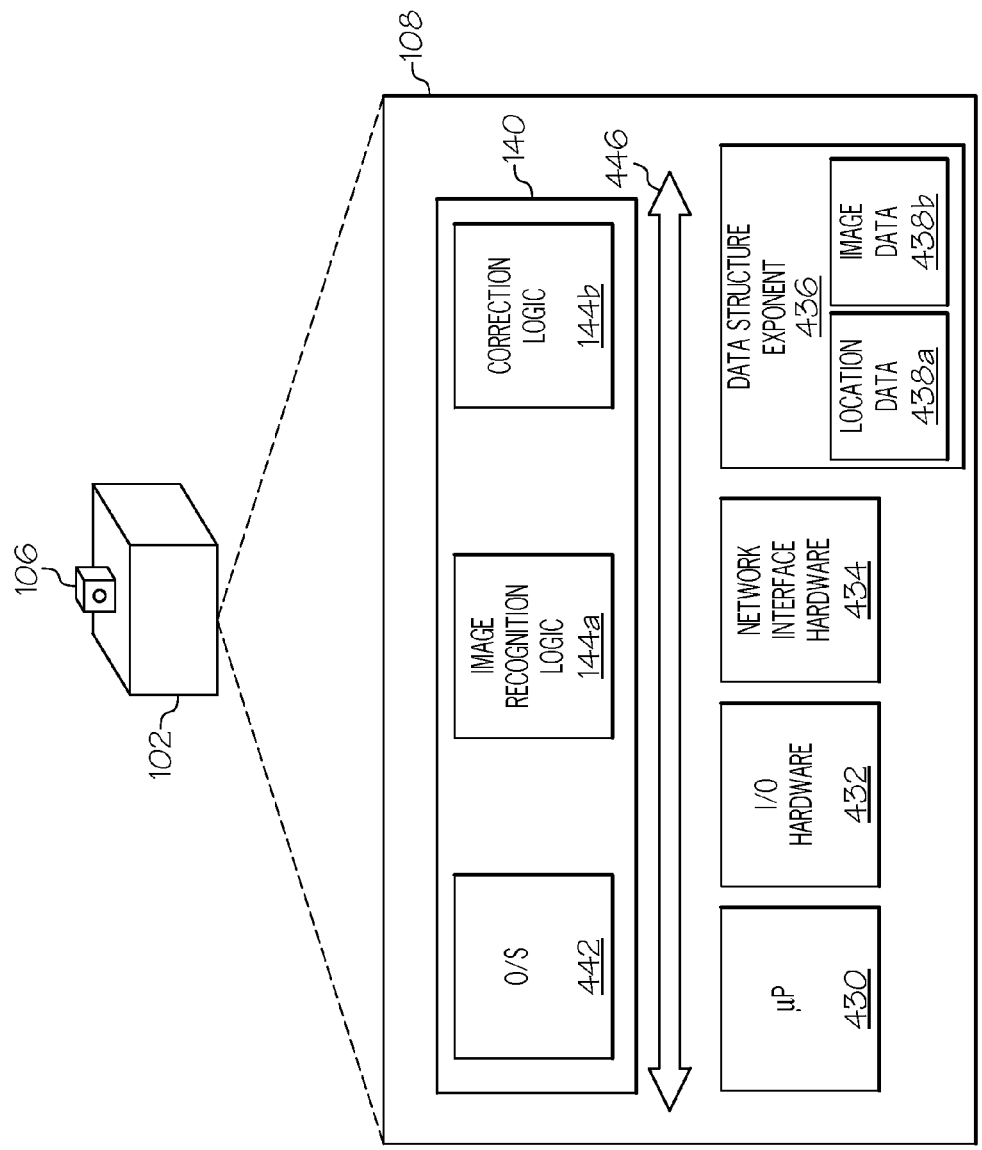
FIG. 4 schematically depicts a robot for measuring image recognition accuracy, according to embodiments disclosed herein.

FIG. 4 schematically depicts a robot 102 for measuring image recognition accuracy, according to embodiments disclosed herein. The robot may include the local computing device 108, which includes a processor 430, input/output hardware 432, network interface hardware 434, a data storage component 436 (which stores location data 438a, content data 438b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the local computing device 108 and/or external to the local computing device 108.

The memory component 140 may store operating system logic 442, the image recognition logic 144a and the correction logic 144b. The image recognition logic 144a and the correction logic 144b may each include a plurality of different pieces of logic, each of which may be embodied as a computer program, firmware, and/or hardware, as an example. A local interface 446 is also included in FIG. 4 and may be implemented as a bus or other communication interface to facilitate communication among the components of the local computing device 108.

The processor 430 may include any processing component operable to receive and execute instructions (such as from a data storage component 436 and/or the memory component 140). As described above, the input/output hardware 432 may include and/or be configured to interface with the image capture device 106 and/or other components of FIG. 4.

The network interface hardware 434 may include and/or be configured for communicating with any wired or wireless networking hardware, including an antenna, a modem, a LAN port, wireless fidelity (Wi-Fi) card, WiMax card, mobile communications hardware, and/or other hardware for communicating with the network 100, other networks, and/or devices. From this connection, communication may be facilitated between the local computing device 108 and other computing devices, such as those depicted in FIG. 1.

The operating system logic 442 may include an operating system and/or other software for managing components of the local computing device 108. As discussed above, the image recognition logic 144a may reside in the memory component 140 and may be configured to cause the processor 430 to identify an object and/or an identifier and recognize the object, as described above. Similarly, the correction logic 144b may be utilized to compare the perceived characteristic with the actual characteristic, as well as determine a change to the image correction logic, as desired.

It should be understood that while the components in FIG. 4 are illustrated as residing within the robot 102 and local computing device 108, this is merely an example. In some embodiments, one or more of the components may reside external to the local computing device 108. It should also be understood that, while the local computing device 108 is illustrated as a single device, this is also merely an example. In some embodiments, the image recognition logic 144a and the correction logic 144b may reside on different computing devices. As an example, one or more of the functionalities and/or components described herein may be provided by the robot 102, the remote computing device 104 and/or other computing devices, which may be coupled to the robot 102 via the network 100. These computing devices may also include hardware and/or software for performing the functionality described herein.

Additionally, while the local computing device 108 is illustrated with the image recognition logic 144a and the correction logic 144b as separate logical components, this is also an example. In some embodiments, a single piece of logic may cause the robot 102 to provide the described functionality.

As illustrated above, various embodiments for image recognition accuracy are disclosed. As will be understood, these embodiments provide a real-time process for improving image recognition. This allows a robot or other device to be continuously implemented with the ability to improve the image recognition during implementation.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for measuring image recognition accuracy It should also be understood that these embodiments are merely exemplary and are not intended to limit the scope of this disclosure.

What is claimed is:

1. A method for measuring image recognition accuracy comprising:
    locating, by a computing device, an identifier in an environment, wherein the identifier is configured according to a predetermined format and wherein the identifier provides data that identifies an actual characteristic of an object;
    locating, by the computing device, the object in the environment;
    determining, by the computing device, a perceived characteristic of the object;
    determining, by the computing device, from the identifier, the actual characteristic of the object;
    comparing, by the computing device, the actual characteristic of the object with the perceived characteristic of the object;
    determining, by the computing device, whether the actual characteristic of the object corresponds with the perceived characteristic of the object to measure image recognition accuracy;
    in response to determining that the actual characteristic of the object does not correspond with the perceived characteristic of the object, determining, by the computing device, a change to make for improving the image recognition accuracy; and
    providing, by the computing device data related to the image recognition accuracy for display.

2. The method of claim 1, wherein the identifier comprises at least one of the following: a bar code, a quick response (QR) code, and a radio frequency (RF) identifier.

3. The method of claim 1, wherein the perceived characteristic comprises at least one of the following: an orientation of the object, an identification of the object, and a location of the object.

4. The method of claim 1, further comprising determining a threshold to determine whether the perceived characteristic corresponds with the actual characteristic.

5. The method of claim 4, further comprising comparing the threshold with the comparison of the perceived characteristic and the actual characteristic.

6. The method of claim 1, further comprising:
    determining a location of the object;
    identifying the object, based on the location; and
    comparing the object with the perceived characteristic to determine the image recognition accuracy.

7. The method of claim 1, further comprising changing an aspect of image recognition logic to improve the image recognition accuracy.

8. A system for measuring image recognition accuracy comprising:
- a robot that traverses an environment, wherein the robot comprises an image capture device and a local computing device, wherein the local computing device includes a memory component that stores image recognition logic that, when executed by a processor, causes the robot to perform at least the following:
  - utilize the image capture device to locate an identifier in the environment, wherein the identifier is configured according to a predetermined format and wherein the identifier identifies an object;
  - determine an actual identity of the object from the identifier;
  - utilize the image capture device to locate the object in the environment; and
  - determine a perceived identity of the object; and
- wherein the memory component further stores correction logic that causes the robot to perform at least the following:
  - compare the actual identity of the object with the perceived identity of the object;
  - determine whether the actual identity of the object corresponds with the perceived identity of the object to measure image recognition accuracy;
  - in response to determining that the actual identity of the object does not correspond with the perceived identity of the object, determine a change to make for improving image recognition; and
  - provide data related to the image recognition accuracy for display.

9. The system of claim 8, wherein the identifier comprises at least one of the following: a bar code, a quick response (QR) code, and a radio frequency (RF) identifier.

10. The system of claim 8, wherein the image recognition logic further causes the robot to determine at least one of the following: an orientation of the object and a location of the object.

11. The system of claim 8, wherein the correction logic further causes the robot to determine a threshold to determine whether the perceived characteristic corresponds with the actual identity.

12. The system of claim 11, wherein the correction logic further causes the robot to compare the threshold with the comparison of the perceived identity and the actual identity.

13. The system of claim 8, further comprising a remote computing device, wherein the remote computing device stores the correction logic.

14. The system of claim 8, wherein the local computing device stores the correction logic.

15. A computing device for measuring image recognition accuracy, comprising:
- a memory component that stores logic that, when executed by the computing device, causes the computing device to perform at least the following:
  - locate an identifier in an environment, wherein the identifier is configured according to a predetermined format and wherein the identifier identifies an actual characteristic of an object;
  - locate the object in the environment;
  - determine a perceived characteristic of the object;
  - determine, from the identifier, the actual characteristic of the object;
  - compare the actual characteristic of the object with the perceived characteristic of the object to determine an image recognition accuracy;
  - provide data associated with the image recognition accuracy for display;
  - determine whether the image recognition accuracy meets a predetermined threshold; and
  - in response to determining that the image recognition accuracy does not meet the threshold, determine a change to make for improving the image recognition accuracy.

16. The computing device of claim 15, wherein the identifier comprises at least one of the following: a bar code, a quick response (QR) code, and a radio frequency (RF) identifier.

17. The computing device of claim 15, wherein the perceived characteristic comprises at least one of the following: an orientation of the object, an identification of the object, and a location of the object.

18. The computing device of claim 15, wherein the logic is further configured to perform at least the following:
- determine a location of the object;
- identify the object, based on the location; and
- compare the object with the perceived characteristic to determine the image recognition accuracy.

19. The computing device of claim 15, wherein the logic is further causes the computing device to change an aspect of image recognition logic to improve the image recognition accuracy.

20. The computing device of claim 15, wherein the computing device is constructed as part of a robot that traverses the environment.

* * * * *